US008678236B2

(12) United States Patent
Burke et al.

(10) Patent No.: US 8,678,236 B2
(45) Date of Patent: Mar. 25, 2014

(54) SIMPLE SERVE TOPPING DISPENSER

(75) Inventors: Sarah Jane Burke, Amherst, NY (US); Diego Viana, Tonawanda, NY (US); Christopher Tirone, East Aurora, NY (US); Donald Fuchs, Mentor, OH (US); Jeffery Kalman, Cleveland Heights, OH (US); David Boll, Avon, OH (US); Robert Soreo, Cleveland Heights, OH (US)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 13/540,706

(22) Filed: Jul. 3, 2012

(65) Prior Publication Data

US 2014/0008390 A1    Jan. 9, 2014

(51) Int. Cl.
*B65D 35/28* (2006.01)

(52) U.S. Cl.
USPC ............ 222/101; 222/105; 222/325; 222/214

(58) Field of Classification Search
USPC ............. 222/92, 95, 101–103, 105, 325–326, 222/214
See application file for complete search history.

(56) References Cited

U.S. PATENT DOCUMENTS

| | | | | |
|---|---|---|---|---|
| 1,556,437 A | * | 10/1925 | Granger | 222/101 |
| 2,837,243 A | * | 6/1958 | La Zebnik | 222/101 |
| 2,936,006 A | * | 5/1960 | Henley James D | 222/101 |
| 3,221,940 A | * | 12/1965 | Watson, Jr. | 222/96 |
| 3,252,624 A | * | 5/1966 | Watson, Jr. | 222/96 |
| 3,543,966 A | * | 12/1970 | Shapero et al. | 222/94 |
| 3,647,117 A | * | 3/1972 | Hargest | 222/100 |
| 4,331,265 A | * | 5/1982 | Warlick | 222/101 |
| 4,513,885 A | * | 4/1985 | Hogan | 222/95 |
| 4,627,551 A | * | 12/1986 | Kopp | 222/1 |
| 4,715,517 A | * | 12/1987 | Potter et al. | 222/181.2 |
| 4,850,971 A | * | 7/1989 | Colvin | 604/134 |
| 5,195,659 A | * | 3/1993 | Eiskant | 222/102 |
| 5,262,070 A | * | 11/1993 | Ishida | 210/800 |
| 5,456,824 A | * | 10/1995 | Misumi et al. | 210/97 |
| D363,847 S | * | 11/1995 | Young | D6/541 |
| 5,490,613 A | | 2/1996 | Taylor et al. | |
| 5,692,645 A | | 12/1997 | Ryu | |
| 5,845,813 A | * | 12/1998 | Werner | 222/101 |
| 5,957,334 A | * | 9/1999 | Rosario | 222/102 |
| 6,196,420 B1 | * | 3/2001 | Gutierrez et al. | 222/101 |
| 6,345,734 B2 | * | 2/2002 | Schalow et al. | 222/103 |
| 6,454,133 B1 | * | 9/2002 | Lopez et al. | 222/102 |
| 6,564,999 B1 | | 5/2003 | Saveliev et al. | |
| 6,572,016 B2 | | 6/2003 | Saveliev et al. | |

(Continued)

*Primary Examiner* — Paul R Durand
*Assistant Examiner* — Randall Gruby
(74) *Attorney, Agent, or Firm* — Fay Sharpe LLP

(57) ABSTRACT

A dispenser for dispensing serving portions of topping onto beverages and desserts comprises a first compartment portion and a second compartment portion hingedly connected to the first compartment portion. One of the compartment portions includes a backing surface and a bag holding member operable to releasably attach a product bag to the compartment portion adjacent the backing surface. The other compartment portion includes a squeeze member, for example a cylindrical roller, mounted for travel in upward and downward directions. The squeeze member is arranged to contact the product bag when the second compartment portion is closed relative to the first compartment portion. The dispenser also comprises an actuating lever mechanically connected to the squeeze member, for example by a one-way advancing mechanism, wherein the actuating lever is operable by a user to advance the squeeze member in the downward direction to dispense product. The dispenser facilitates cleaning and product replacement.

16 Claims, 11 Drawing Sheets

(56) References Cited

U.S. PATENT DOCUMENTS

| | | |
|---|---|---|
| 6,662,971 B1 * | 12/2003 | Nguyen et al. ............... 222/101 |
| 6,691,894 B2 | 2/2004 | Chrisman et al. |
| 7,086,428 B2 * | 8/2006 | Schroeder et al. ............. 141/65 |
| 7,475,795 B2 | 1/2009 | Faller et al. |
| 7,603,834 B2 | 10/2009 | Schroeder et al. |
| 7,694,849 B1 * | 4/2010 | Wiesner ........................ 222/1 |
| 8,038,032 B2 | 10/2011 | Faller et al. |
| 2007/0138202 A1 * | 6/2007 | Evers ........................... 222/95 |
| 2007/0215649 A1 * | 9/2007 | Tirone et al. .................. 222/391 |

\* cited by examiner

SIMPLE SERVE TOPPING DISPENSER

FIELD OF THE INVENTION

The present invention relates generally to dispensing machines for food products, and more particularly to a dispensing machine for dispensing serving portions of toppings, condiments, and the like from a plastic bag container. For example, the invention is useful for applying whipped topping to hot or cold coffee, desserts, shakes, iced cappuccinos, and frozen drinks

BACKGROUND OF THE INVENTION

Topping dispensers of the type mentioned above are used in fast service restaurants and concession operations, where they are subjected to heavy usage on a daily basis. Some dispensers may be available for use by patrons or by a large number of service employees. In this regard, ease of use in dispensing topping is essential.

It is frequently necessary to remove a spent bag of topping product and replace the spent bag with a new full bag of topping product. A dispenser that permits fast and easy replacement of topping bags is quite desirable.

Topping dispensers must be cleaned on a regular basis. It is advantageous that the dispenser be easy to clean in a thorough manner.

U.S. Pat. No. 7,475,795 describes a topping dispenser having a refrigerated compartment for receiving a plastic bag containing chilled topping that is to be dispensed in single-serving portions of chilled topping onto a beverage or dessert. The refrigerated compartment houses a drawer that supports a product compartment and a roller drive compartment separated by a partition. The product compartment includes a vertical backing panel having hooks along a top portion thereof for suspending a bag of topping directly adjacent the panel, and a cylindrical roller coupled to a drive mechanism in the drive compartment. The roller is arranged to rotate about a horizontal axis to travel vertically relative to the bag of topping to squeeze topping from the bag through a bottom outlet valve. The panel and rotational axis of the roller extend in a front-to-rear direction of the dispenser which corresponds to the direction of movement of the drawer. While this design is advantageous for providing an automated drive mechanism and a refrigerated compartment in a topping dispenser, the dispenser unit itself is quite deep in the front-to-back direction and therefore requires a deep countertop. Thorough cleaning requires that the backing panel be removed, adding complexity to the cleaning task.

U.S. Pat. No. 8,038,032 discloses a manually operated topping dispenser having a front product-receiving compartment enclosing a laterally disposed cylindrical roller, and a rear drive compartment enclosing a drive mechanism connecting a user lever with the roller to advance the roller. The product compartment is separated from the drive compartment by a partition that provides a backing surface opposite the roller. A front panel on the dispenser is removable or hinged to allow access to the product compartment, however the roller remains in close proximity to the backing surface of the partition. While this design is shallower front-to-back than the dispenser disclosed in aforementioned U.S. Pat. No. 7,475,795, it is time-consuming to clean in a thorough manner.

SUMMARY OF THE INVENTION

A dispenser formed in accordance with an embodiment of the present invention comprises a first compartment portion and a second compartment portion hingedly connected to the first compartment portion. One of the compartment portions includes a backing surface and a bag holding member operable to releasably attach a product bag to the compartment portion adjacent the backing surface. The other compartment portion includes a squeeze member, for example a cylindrical roller, mounted for travel in upward and downward directions. The squeeze member is arranged to contact the product bag when the second compartment portion is closed relative to the first compartment portion. The dispenser also comprises an actuating lever mechanically connected to the squeeze member, for example by a one-way advancing mechanism, wherein the actuating lever is operable by a user to advance the squeeze member in the downward direction. In one embodiment, the bag holding member and backing surface are associated with the first compartment portion, while the squeeze member and actuating lever are associated with the second compartment portion, however this arrangement may be reversed without straying from the invention.

The dispenser may have a base and an upstanding member extending upwardly from the base. One of the compartment portions may be supported by the upstanding member, thereby providing vertical space between the base and an outflow valve of a product bag installed in the dispenser for accommodating a beverage container, bowl, or other serving holder.

The actuating lever may be a U-shaped member having a pair of legs pivotally mounted to the second compartment portion on opposite sides of the outflow valve so as to provide a centered lever that does not block the user's view of the outflow valve and serving receptacle.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
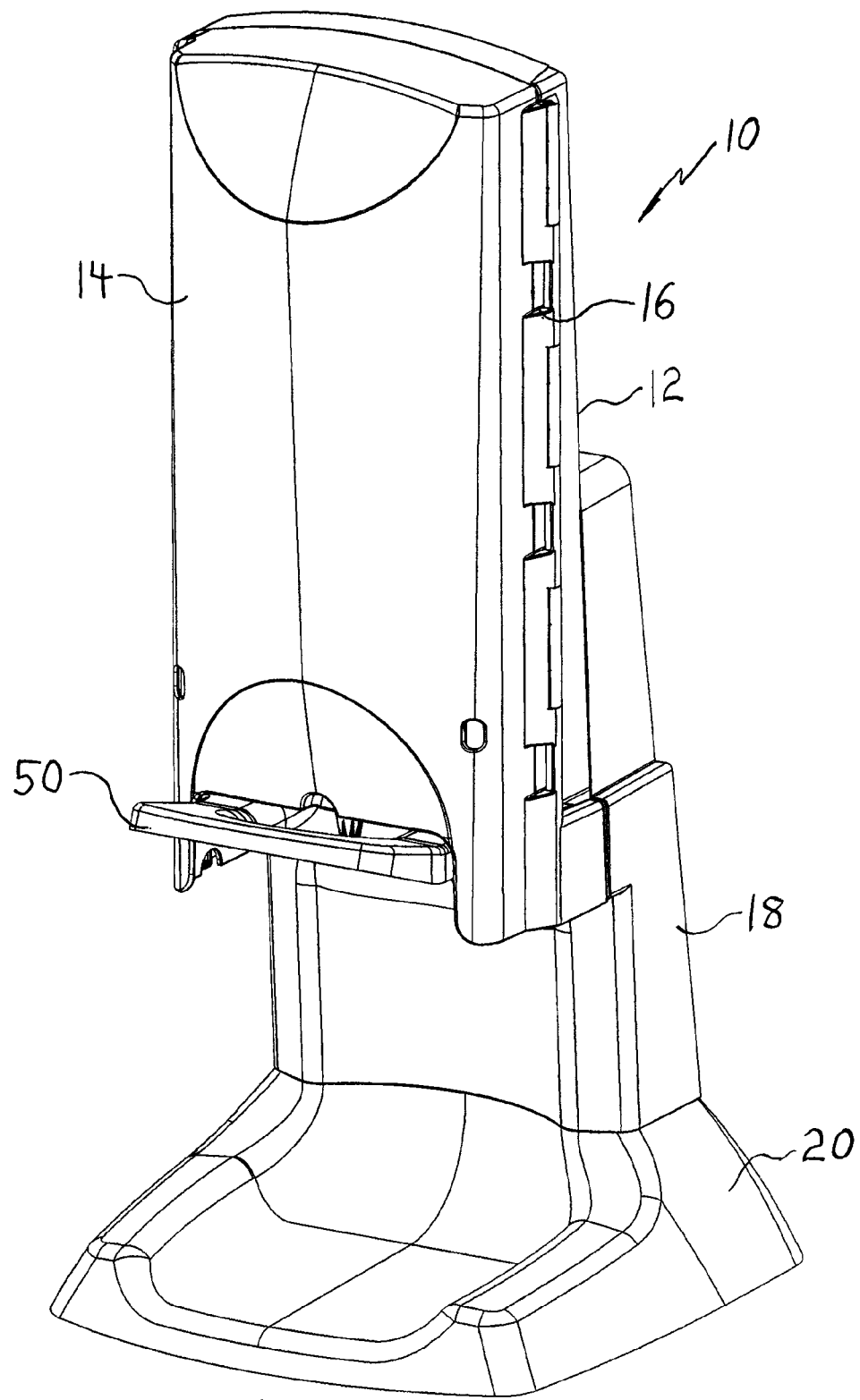
FIG. 1 is a perspective view of a dispenser formed in accordance with an embodiment of the present invention.
Figure 2:
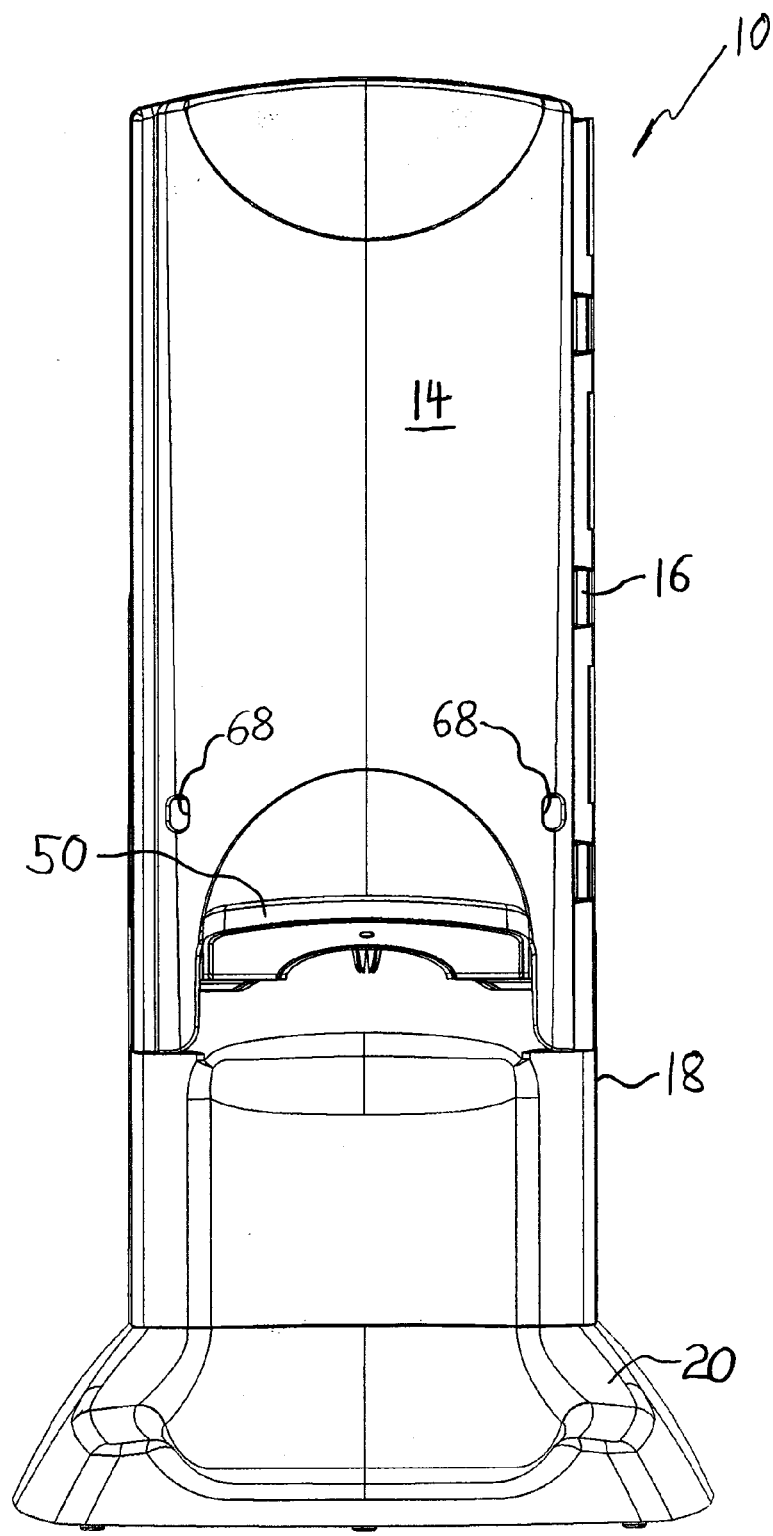
FIG. 2 is a front elevational view of the dispenser shown in FIG. 1.
Figure 3:
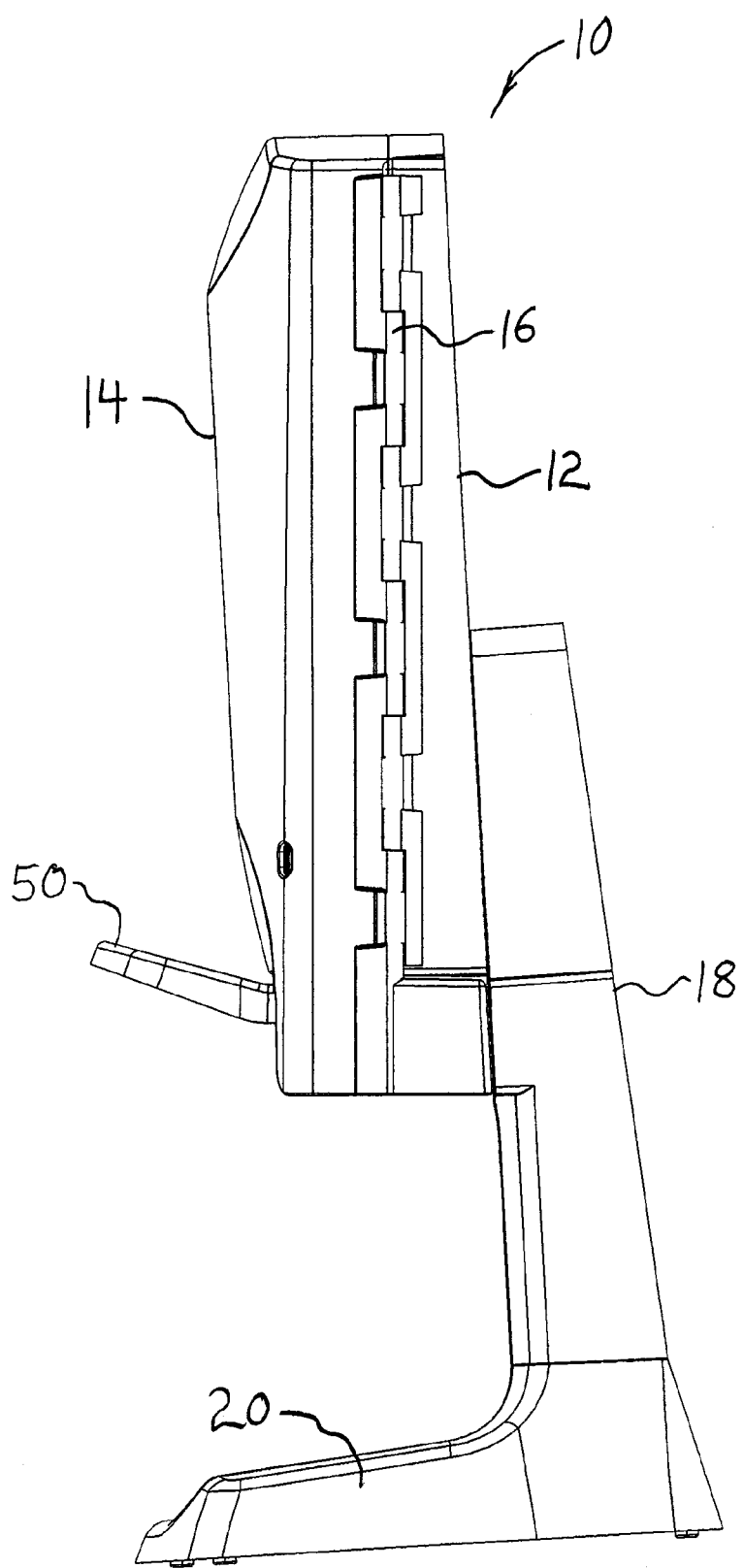
FIG. 3 is a side elevational view of the dispenser shown in FIG. 1.

A dispenser formed in accordance with an embodiment of the present invention is shown in FIGS. 1-3 and identified generally by reference numeral 10. Dispenser 10 generally comprises a first compartment portion 12 and a second compartment portion 14 connected to first compartment portion 12 by a hinge 16 arranged along adjacent side edges of the first and second compartment portions. First compartment portion 12 may be supported by an upstanding member 18 extending upwardly from a base 20, whereby the first and second compartment portions may be spaced vertically from base 20. If base 20 and upstanding member 18 are omitted, the dispenser may be positioned adjacent an edge of a countertop to accommodate a serving receptacle.

Figure 4:
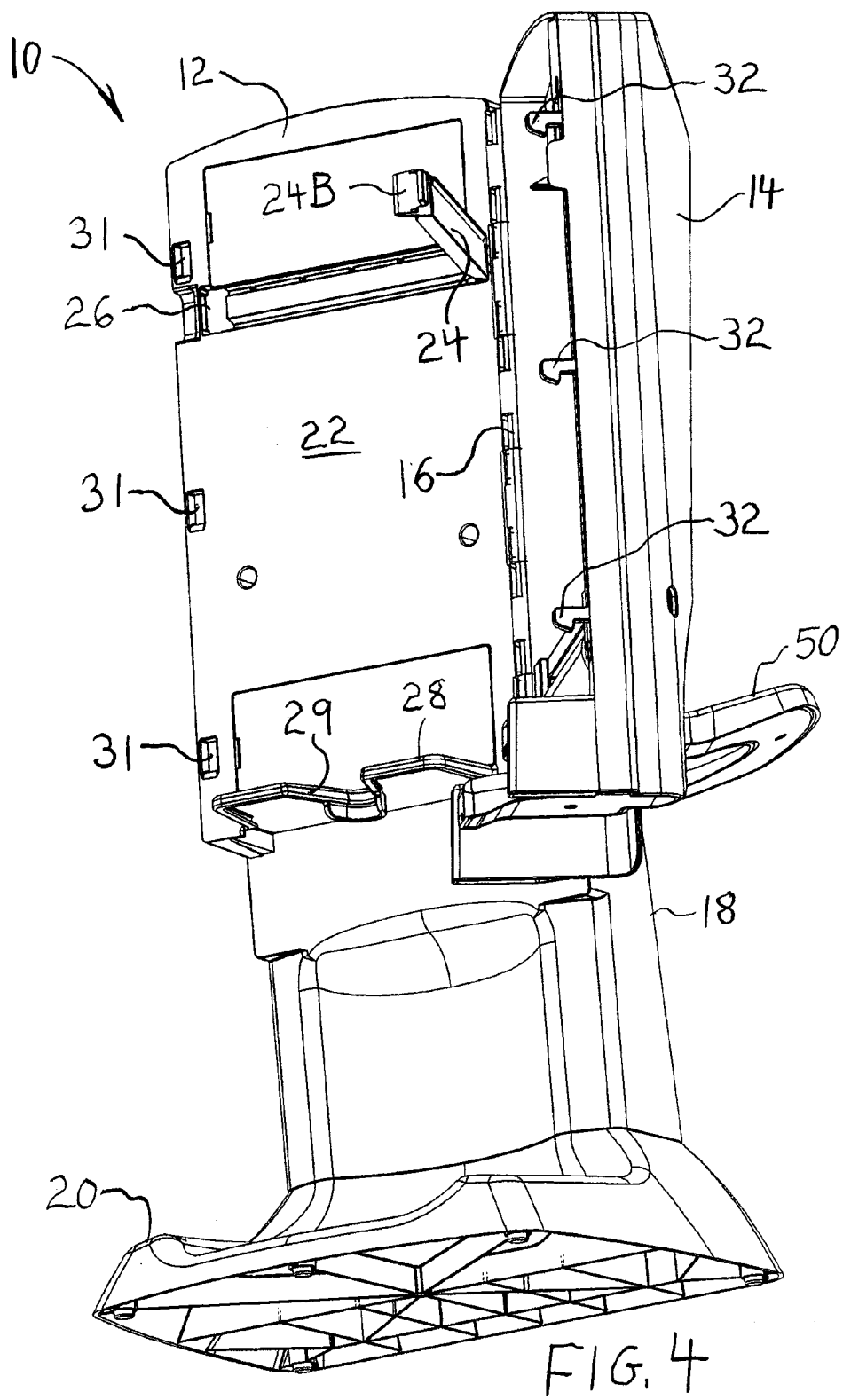
FIG. 4 is another perspective view of the topping dispenser shown in FIG. 1, wherein a second compartment portion and a bag holding member of the dispenser are shown in respective open positions relative to a first compartment portion of the dispenser.
Figure 5A:
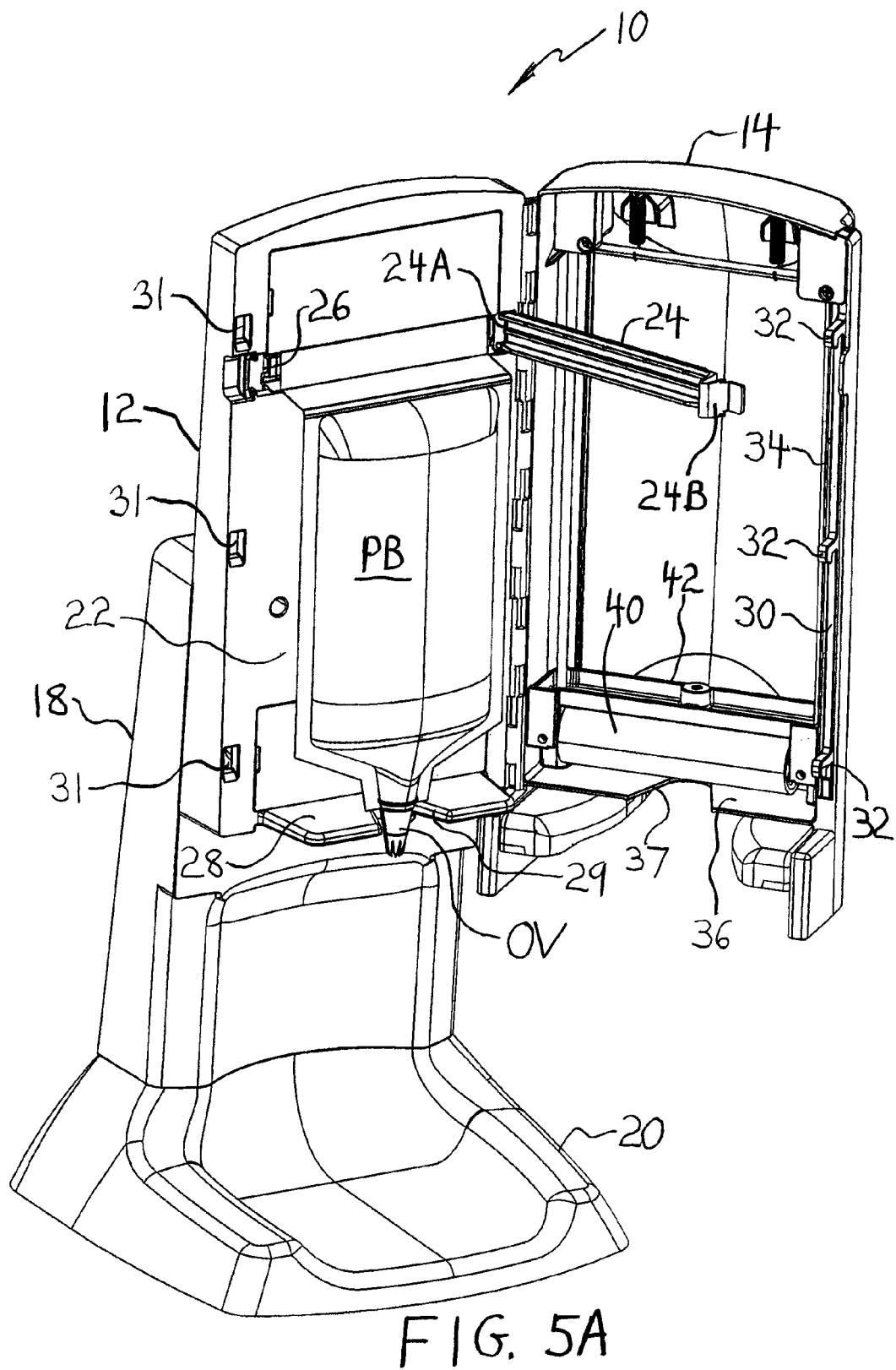
FIGS. 5A is a perspective view of the topping dispenser shown in FIG. 1, wherein the second compartment portion and the bag holding member are shown in their open positions and a product bag is shown in place for installation in the dispenser.
Figure 5B:
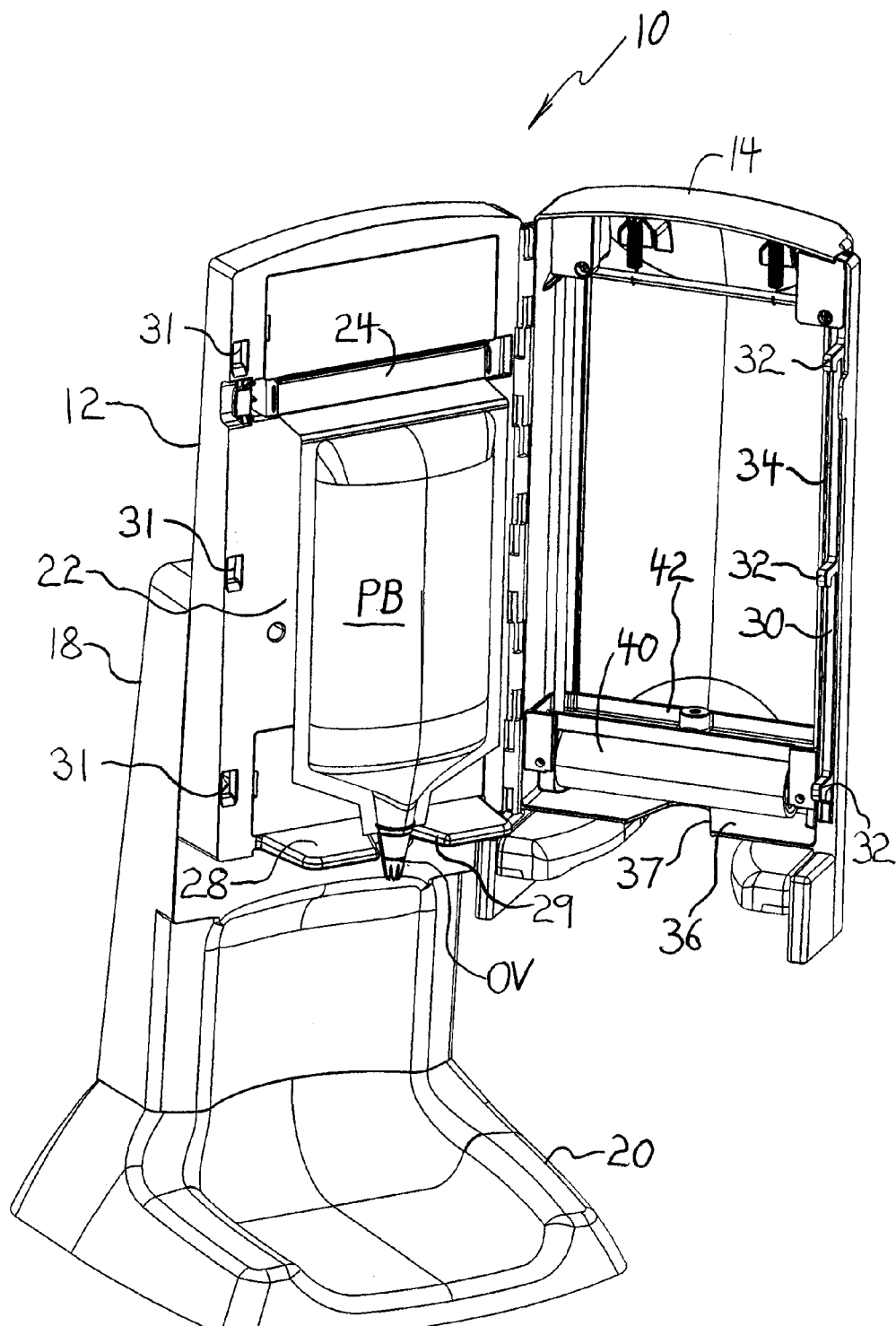
FIG. 5B is a perspective view similar to that of FIG. 5A, wherein the bag holding member is shown in its closed position to attach the product bag.
Figure 6:
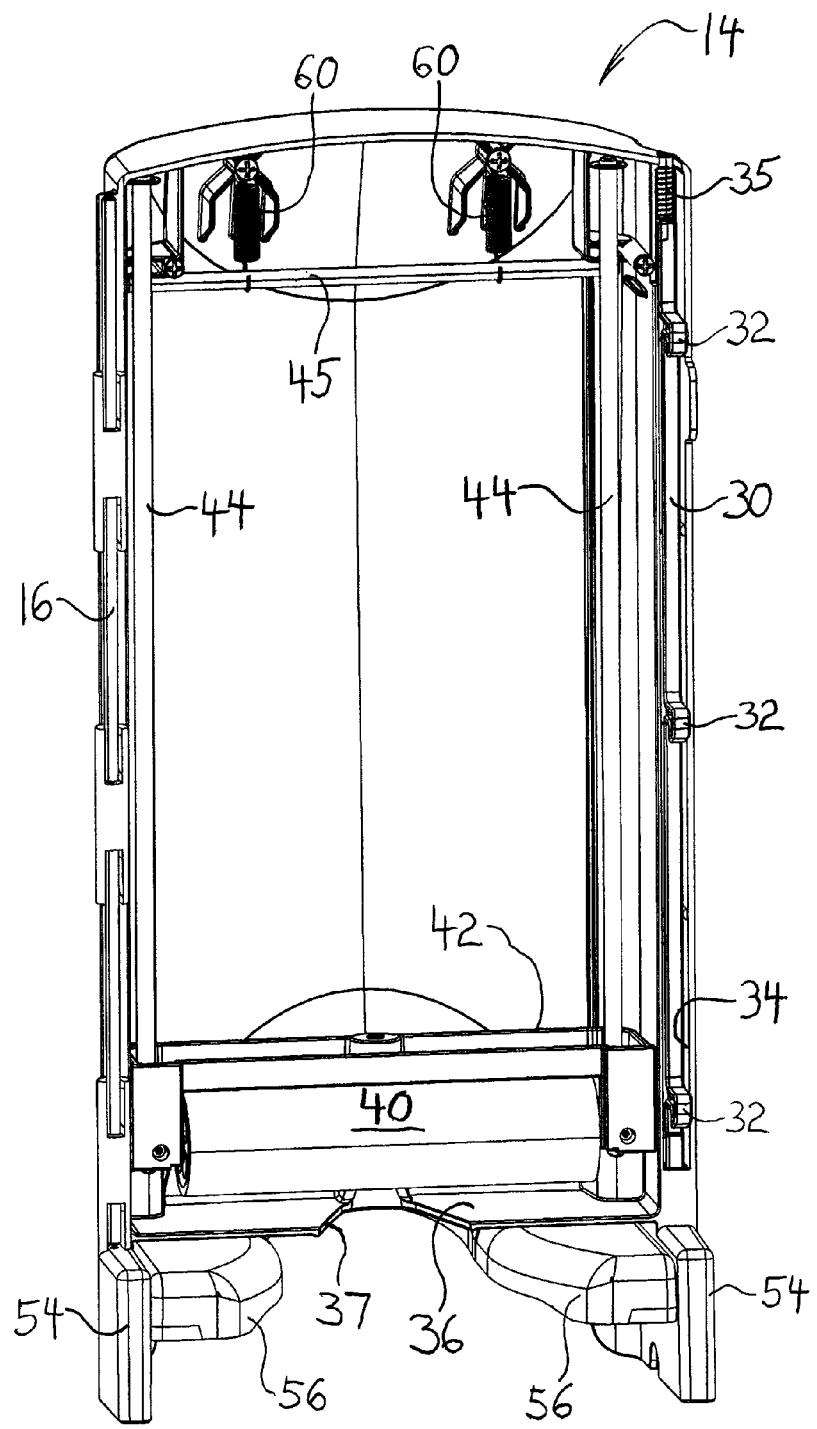
FIG. 6 is a perspective view showing internal structure of the second compartment portion.

Referring also now to FIGS. 4-6, first compartment portion 12 includes a backing surface 22 and a bag holding member 24 operable to releasably attach a product bag to the first compartment portion adjacent backing surface 22. In the depicted embodiment, bag holding member 24 is embodied as an elongated clip arranged along an upper edge of backing surface 22, wherein a first end 24A of the clip is hingedly mounted to first compartment portion 12 and a second end 24B of the clip is configured for releasable snap-fitting into a retaining recess 26. Thus, as illustrated by FIGS. 5A-5B, the clip forming bag holding member 24 may be closed onto a top portion of a new product bag PB to securely and releasably attach the product bag to first compartment portion 12 adjacent backing surface 22. Bag holding member 24 may take a variety of other forms. For example, the bag holding member may be embodied as one or more hooks provided along edges of backing surface 22, and the product bag may have corresponding hook-receiving hole(s) for attaching the product bag by the one or more hooks. As another example, the bag receiving member may take the form of one or more elongated spring-loaded clips operable to clamp a portion of product bag PB in the manner of a clipboard clip. As a further example, a plurality of smaller spring-loaded clips may be provided to grip different locations on the product bag. As a further example, a clip member tightened by operation of a lever and cam arrangement could be used as bag holding member 24.

First compartment portion 12 may further include a horizontal shelf 28 having a shelf opening 29 arranged to receive an outflow valve OV of product bag PB attached by the bag holding member 24. Shelf opening 29 facilitates proper location of outflow valve OV during product bag replacement, and may be open-mouthed in the forward direction. Base 20 and upstanding member 18 provide vertical space to accommodate a serving receptacle beneath outflow valve OV when the dispenser is operated. Base 20 and upstanding member may be integrated into a single piece or block. However, if base 20 and upstanding member 18 are omitted, the dispenser may be positioned adjacent an edge of a countertop with outflow valve OV projecting over the countertop edge to accommodate a serving receptacle beneath the outflow valve.

Second compartment portion 14 is hingedly connected to the first compartment portion 12 by hinge 16 and includes a vertical latch member 30 having a plurality of latch elements 32 arranged to engage a corresponding plurality of catch elements 31 on first compartment portion 12. Latch member 30 may be slidably arranged in a channel 34 to permit vertically-guided displacement of latch member 30 against the force of a biasing spring 35. Each latch element 32 may be contoured to engage and slide along an edge of a corresponding catch element 31 as second compartment portion 14 is closed onto first compartment portion 12, such that latch member 30 will be temporarily displaced upwardly against the biasing force and then urged downwardly by the biasing force to allow latch elements 32 to engage catch elements 31 to secure the second compartment portion in a closed position relative to the first compartment portion. Channel 34 opens through a bottom surface of second compartment portion 14 such that a bottom end of latch member 30 is accessible to allow a user to press the latch member 30 in an upward direction against the biasing force of spring 35 to unlatch and open second compartment portion 14 relative to first compartment portion 12.

Second compartment portion 14 may include a bottom wall 36 having a wall opening 37 arranged to overlap with shelf opening 29 when second compartment portion 14 is closed relative to first compartment portion 12. Wall opening 37 may be open-mouthed in the rearward direction such that when second compartment portion 14 is closed onto first compartment portion 12, wall opening 37 will receive the outflow valve OV of a product bag PB attached on first compartment portion 12. As may be understood, shelf opening 29 and wall opening 37 cooperate to confine outflow valve OV in a substantially fixed dispensing position.

Second compartment portion 14 further includes a squeeze member 40 mounted for travel in an upward direction and a downward direction. Squeeze member 40 is arranged to contact a product bag PB attached by bag holding member 24 when second compartment portion 14 is closed relative to first compartment portion 12. Squeeze member 40 may take the form of a cylindrical roller as shown in the figures, however squeeze member 40 may take other forms. For example, squeeze member 40 may take the form of a bar having a flat surface contacting the product bag, or a strip having an edge contacting the product bag. Squeeze member 40 may have a resilient material on its contact surface or contact edge provide smooth and continuous contact with the product bag as the bag is pressed against backing surface 22 to maximize the amount of product squeezed from the bag.

Figure 7:
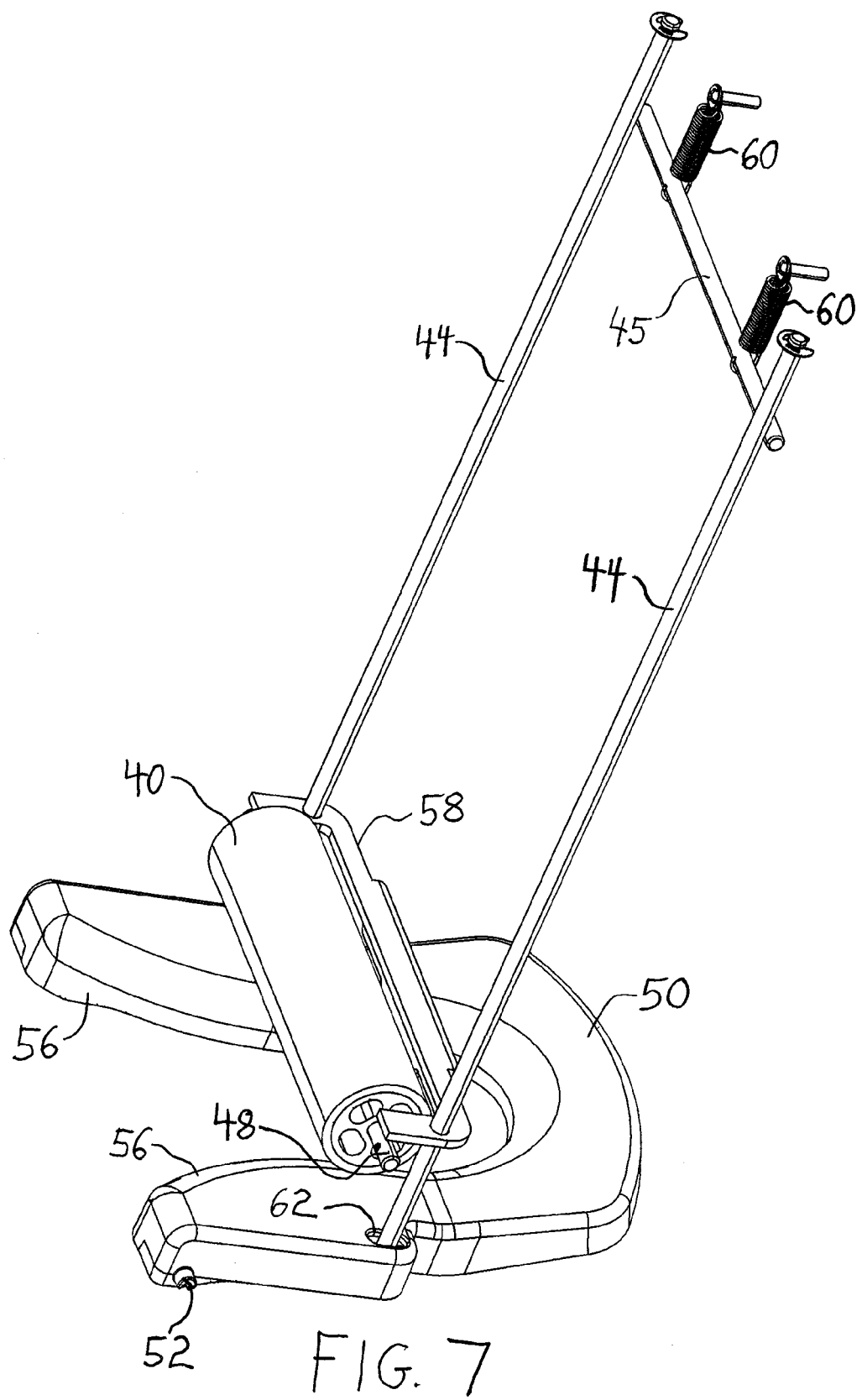
FIG. 7 is another perspective view showing a squeeze member in the second compartment portion and an actuating mechanism for advancing the squeeze member.
Figure 8:
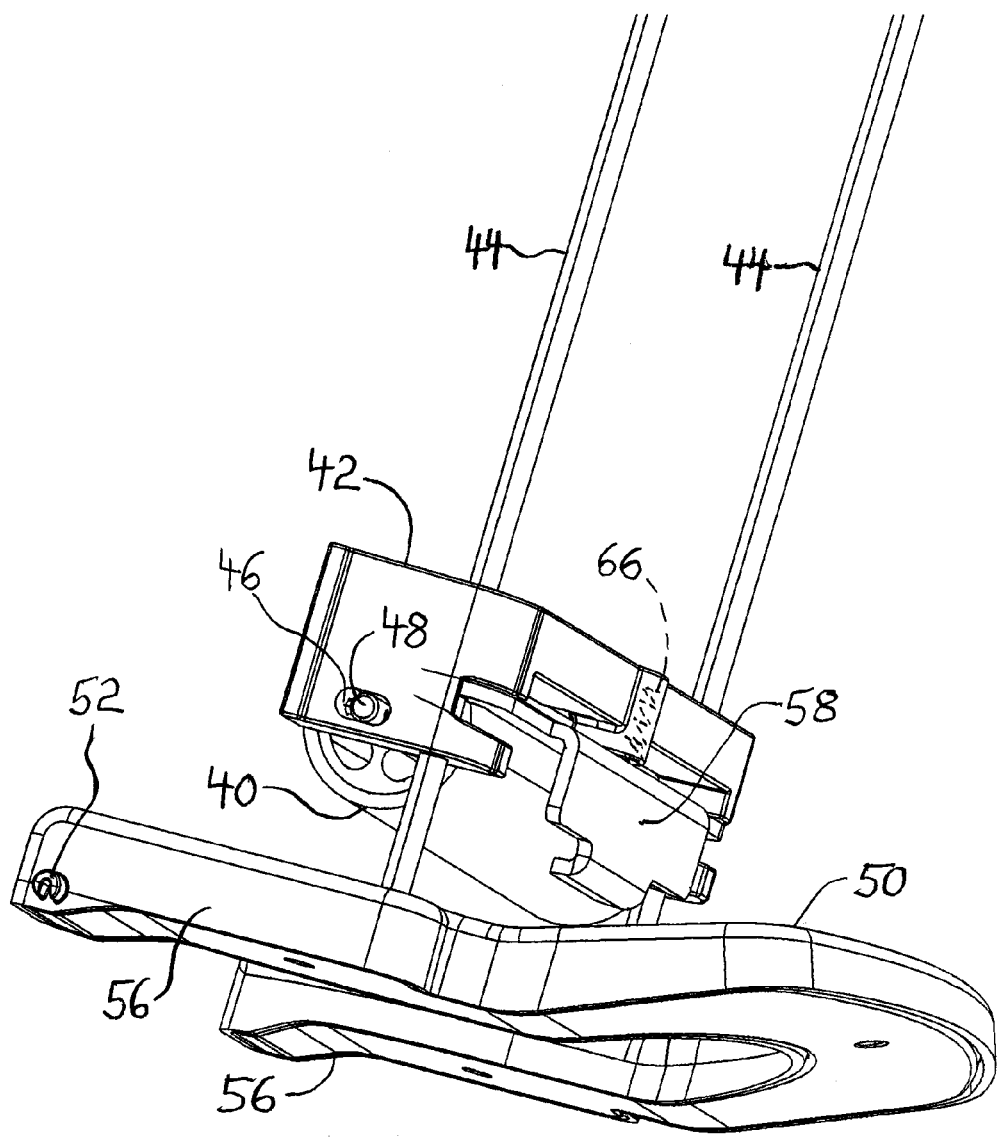
FIG. 8 is another perspective view showing a carriage for the squeeze member.
Figure 9:
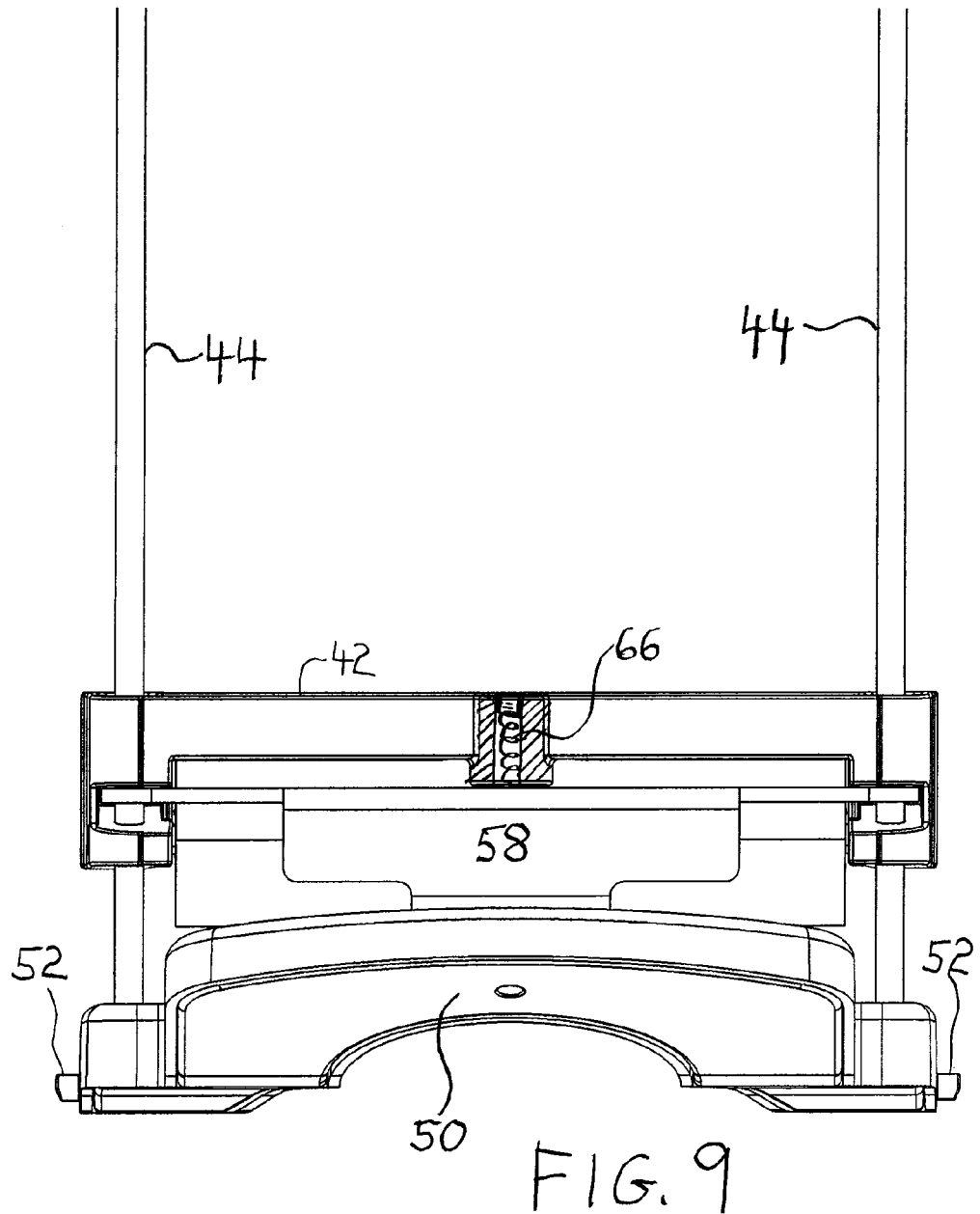
FIG. 9 is an elevational view, partially sectioned, showing the relationship between a gripping bracket of the actuating mechanism and the squeeze member carriage.

Additional reference is made now to FIGS. 7-9. Squeeze member 40 may be carried by a carriage 42 slidably mounted on a pair of vertical guide rods 44 arranged on opposite sides of second compartment portion 14. In the embodiment shown, carriage 42 has a pair of journal openings 46 (only one journal opening being visible in FIG. 8) for supporting opposite ends of an axle 48 of roller 40 acting as the squeeze member in the depicted embodiment.

An actuating lever 50 is pivotally mounted on second compartment portion 14 at a lower region thereof. For pivotal mounting, actuating lever may include a pair of pivot pins 52 on opposite sides thereof, and second compartment portion 14 may include downward extensions 54 having a pair of inwardly facing holes (not visible) for receiving pivot pins 52. Actuating lever 50 may be a U-shaped member having a pair of legs 56 arranged on opposite sides of wall opening 37, wherein each leg 56 is pivotally mounted to second compartment portion by a respective pivot pin 52 extending laterally from leg 56. Configuring and mounting the actuating lever 50 in this manner arranges the legs of the actuating member on opposite sides of outflow valve OV so as to provide a centered actuating lever that does not block the user's view of the outflow valve and serving receptacle.

Actuating lever 50 is mechanically connected to squeeze member 40 and is operable by a user to advance the squeeze member 40 in the downward direction. As a result, product contained within product bag PB is progressively squeezed downward and dispensed through outflow valve OV. Actuating lever 50 may be mechanically connected to squeeze member 40 by way of guide rods 44, a gripping bracket 58, and carriage 42. In the depicted embodiment, guide rods 44 extend through aligned holes in carriage 42 and gripping bracket 58 and are rigidly coupled to one another at their upper ends by a crossbar 45. As may be see in FIG. 6, crossbar 45 is suspended from a top region of second compartment portion 14 by a pair of springs 60. A lower segment of each guide bar 44 extends through a slot 62 in actuating lever 50 located forwardly of a pivot axis defined by pivot pins 52, and a washer (not visible) is attached to the lower end of each guide bar 44 for engagement by an undersurface of actuating lever 50. As best understood from FIGS. 8 and 9, a spring 66 acts between carriage 42 and gripping bracket 58 to tilt the gripping bracket at a slight angle away from normal relative to guide rods 44 so the bracket holes grip the rods when the rods move in the downward direction. Thus, when actuating lever 50 is pivoted downward by a user, the undersurface of actuating lever 50 engages washers 62 to displace guide rods 44 and crossbar 45 in the downward direction against the urging of suspension springs 60, and the downward displacement of guide rods 44 brings a corresponding downward displacement of gripping bracket 58, carriage 42, and squeeze member 40. When actuating lever 50 is released by the user, suspension springs 60 pull crossbar 45, guide rods 44, and washers 62 in the upward direction such that the washers 62 engage the undersurface of actuating lever 50 and cause the actuating lever to pivot back into a ready position as illustrated in FIG. 1. However, the upwardly directed movement of guide rods 44 is not accompanied by any corresponding upward displacement of gripping bracket 58, carriage 42, or squeeze member 40 because gripping bracket 58 acts in a one-way ratcheting manner with respect to guide rods 44. Thus, for each pivotal stroke of actuating lever 50, squeeze member 40 moves downward by a predetermined distance, thereby cooperating with backing surface 22 to squeeze a serving volume of product from product bag PB through outflow valve OV to a beverage container positioned beneath the outflow valve. As will be appreciated, each operating stroke of actuating lever 50 dispenses a substantially constant volume of product.

When squeeze member 40 has travelled from an upper start position to a lower end position as shown in FIG. 6, it has progressively travelled over product bag PB to squeeze the bag's contents out of outflow valve OV. Second compartment portion 14 may include one or more windows 68, and carriage 42 may be colored to noticeably appear in windows 68 when it reaches the lower end position to visually alert service personnel of the need the replace or refill product bag PB and reset the position of carriage 42 and squeeze member 40 to the upper start position.

A spent product bag is removed by pushing upwardly on the bottom end of latch member 30 to unlatch second compartment portion 14 from first compartment portion 12, and swinging second compartment portion 14 to an open position. When second compartment portion 14 is opened in this manner, squeeze member 40 and carriage 42 are moved away from the spent product bag, allowing easy access to bag holding member 24, which may be opened as shown in FIG. 5A to remove the spent bag. Backing surface 22 and squeeze member 40, which are now separated from one another, are easily accessible for cleaning purposes. A filled product bag can then be inserted and secured by closing bag holding member 24.

Carriage 42 and squeeze member 40 may be manually reset in an upper start position by reaching under squeeze member 40 and pressing upward on gripping bracket 58 against the bias of spring 66 to release the gripping bracket, and sliding the carriage and squeeze member upward along guide rods 44 to an upper start position. Second compartment portion 14 may then be closed onto and latched with first compartment portion 12. At this point, dispenser 10 is once again ready for use.

Figure 10:
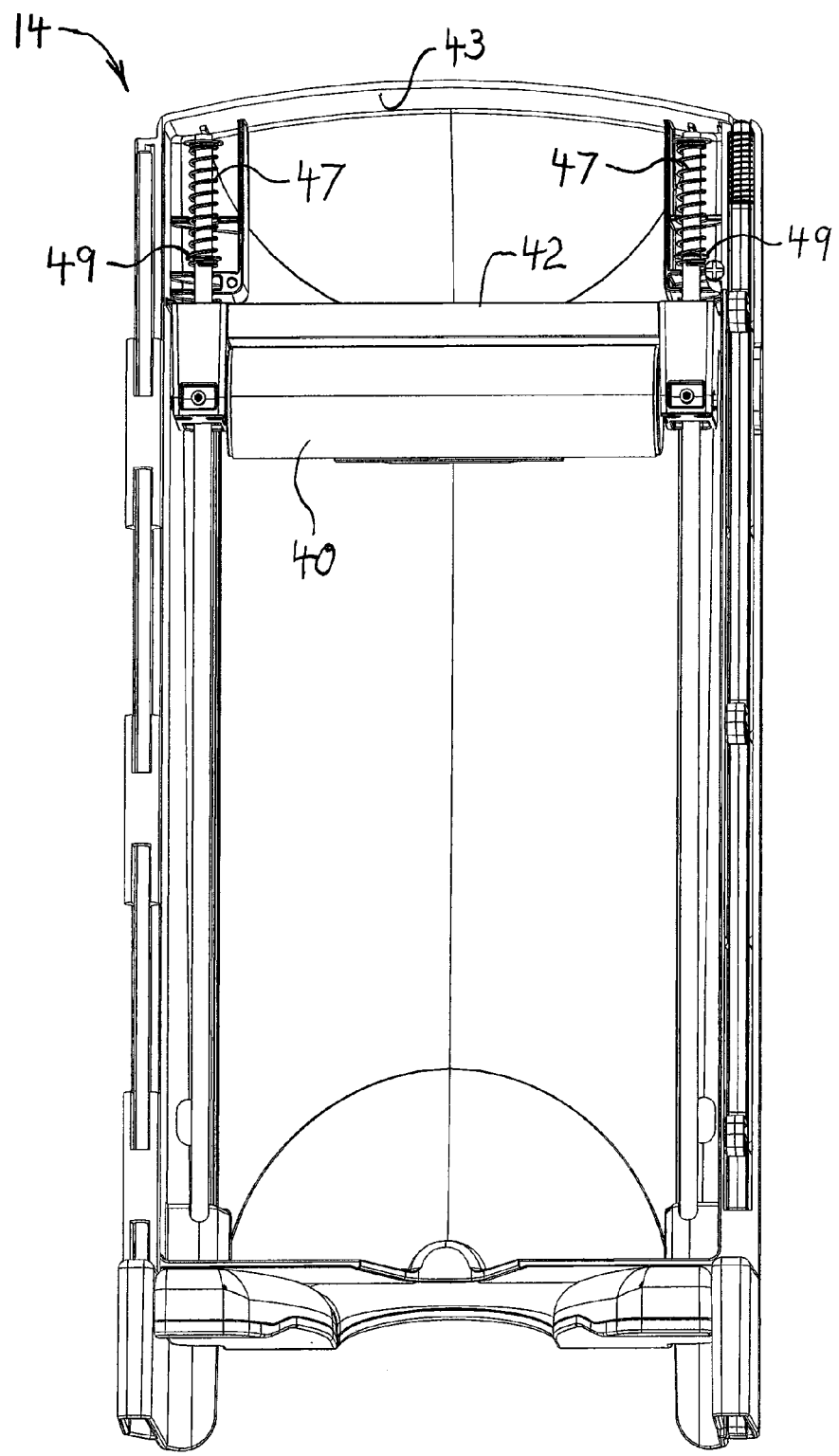
FIG. 10 is a perspective view showing internal structure of the second compartment portion formed in accordance with an alternative embodiment of the present invention.

FIG. 10 illustrates an alternative embodiment of the second compartment portion 14 wherein crossbar 45 and suspension springs 60 are omitted and guide bars 44 are independently mounted and spring-biased by respective springs 47. Each spring 47 may be arranged between a top wall 43 of second compartment portion 14 and a collar 49 fixed on the associated guide rod. When guide rods 44 are displaced in the downward direction by operation of actuating lever 50, springs 47 become loaded and act independently to force guide rods 44 in the upward direction when actuating lever 50 is released. In FIG. 10, squeeze member 40 and carriage 42 are shown in their upper start position.

It will be understood that the embodiment of the present invention shown in the drawings and described above is subject to variation. For example, a "reverse" embodiment wherein the backing surface 22 and bag holding member 24 are provided on hinged second compartment portion 14, and squeeze member 40, carriage 42, guide rods 44, and actuating lever 50 are provided on stationary first compartment portion 12, is within the scope of the present invention.

Most of the components of dispenser 10 may be molded from plastic for economical manufacturing. Such moldable components include at least first compartment portion 12, second compartment portion 14, upstanding member 18, base 20, bag holding member 24, carriage 42, and actuating lever 50.

While the invention has been described in connection with exemplary embodiments, the detailed description is not intended to limit the scope of the invention to the particular forms set forth. The invention is intended to cover such alternatives, modifications, and equivalents of the described embodiment as may be included within the spirit and scope of the invention.

What is claimed is:

1. A dispenser for dispensing a food product, the dispenser comprising:
 a first compartment portion;
 a second compartment portion hingedly connected to the first compartment portion to enable the second compartment to move between an open and a closed position;
 wherein the first compartment portion includes a backing surface and a bag holding member operable to releasably attach a product bag to the first compartment portion adjacent the backing surface, the bag holding member positioned at a top portion of the first compartment, the bag holding member designed to releaseably engage a non-dispensing end of the product bag and prevent the product bag from moving downwardly relative to the first compartment, the first compartment including a shelf, the shelf is connected to a bottom portion of the first compartment, the shelf is spaced downwardly from the bag holding member, the shelf includes a shelf opening designed to receive a dispensing end of the product bag when the product bag is secured to the first compartment by the bag holding member;
 wherein the second compartment portion includes a squeeze member mounted for travel in an upward direction and a downward direction, the squeeze member being arranged to contact the product bag attached by the bag holding member when the second compartment portion is the closed position, movement of the squeeze member in the downward direction causing product in the product bag to be dispensed out from the dispensing end of the product bag when the product bag is secured to the first compartment by the bag holding member and the second compartment is in the closed position, the squeeze member designed to disengage from the product bag when the second compartment is in the open position; and an actuating lever mechanically connected to the squeeze member and pivotally connected to the second compartment, wherein the actuating lever is operable by a user by pivoting the actuating lever downwardly relative to the second compartment to advance the squeeze member in the downward direction.

2. The dispenser according to claim 1, wherein the second compartment portion includes a bottom wall having a wall opening arranged to overlap with the shelf opening when the second compartment portion is in the closed position, the dispensing end of the product bag being entrapped between the bottom wall and the shelf when the product bag is secured to the first compartment by the bag holding member and the second compartment is in the closed position.

3. The dispenser according to claim 1, wherein the actuating lever is a U-shaped member having a pair of legs pivotally mounted to the second compartment portion on opposite sides of the wall opening.

4. The dispenser according to claim 1, wherein the squeeze member is a cylindrical roller.

5. The dispenser according to claim 1, wherein the bag holding member includes an elongated clip positionable to extend along an upper edge of the backing surface, wherein the clip is operable to clamp an edge portion of a product bag.

6. The dispenser according to claim 5, wherein the elongated clip has a hingedly mounted first end and a releasably securable second end, and wherein the clip and the second compartment portion open in a same hinge direction.

7. The dispenser according to claim 1, further comprising a base and an upstanding member extending upwardly from the base, wherein the first compartment portion is supported by the upstanding member, the base including a base cavity positioned underneath and spaced from a bottom end of both the first and second compartments when the second compartment is in the closed position.

8. A dispenser for dispensing a food product from a product bag, said dispenser comprising:

a first compartment portion, said first compartment portion includes a backing surface, a bag holding member and a shelf, said bag holding member operable to releasably attach the product bag to said first compartment portion adjacent said backing surface, said bag holding member positioned at a top portion of said first compartment, said bag holding member designed to releaseably engage a non-dispensing end of the product bag and prevent the product bag from moving downwardly relative to said first compartment, said shelf connected to a bottom portion of said first compartment, said shelf is spaced downwardly from the bag holding member, said shelf includes a shelf opening designed to receive a dispensing end of the product bag when the product bag is secured to the first compartment by said bag holding member;

a second compartment portion hingedly connected to the first compartment portion to enable the second compartment to move between an open and a closed position, said second compartment portion includes a squeeze arrangement and a bottom wall, said squeeze arrangement including a squeeze member mounted for travel in in an upward direction and a downward direction relative to said second compartment, said squeeze member arranged to contact the product bag attached by said bag holding member when said second compartment portion is said closed position, movement of said squeeze member in said downward direction causing product in the product bag to be dispensed out from the dispensing end of the product bag when the product bag is secured to said first compartment by said bag holding member and said second compartment is in the closed position, said squeeze member designed to disengage from the product bag when said second compartment is in said open position, said bottom wall having a wall opening arranged to overlap with said shelf opening when said second compartment portion is in said closed position, the dispensing end of the product bag being entrapped between said bottom wall and said shelf when the product bag is secured to said first compartment by said bag holding member and said second compartment is in said closed position;

an actuating lever mechanically connected to said squeeze arrangement and pivotally connected to said second compartment, said actuating lever operable by a user by pivoting said actuating lever downwardly relative to said second compartment to advance said squeeze member in said downward direction; and, a base and an upstanding member connected to said base and extending upwardly from the base, said upstanding member connected to said first compartment portion, said base including a base cavity positioned underneath and spaced from a bottom end of both said first and second compartments when said second compartment is in said closed position, said actuating lever spaced above said base when said second compartment is in said closed position, the dispensing end of the product bag being spaced above said base when the product bag is secured to said first compartment by said bag holding member and said second compartment is in said closed position.

9. The dispenser as defined in claim 8, wherein said actuating lever is connected to said squeeze arrangement, said squeeze arrangement including a pair of guide rods that are vertically positioned on each vertical side of said second compartment, said actuating lever connected to said pair of guide rods, each of said guide rods movable in an upward and downward position, said guide rods spring biased in said upward position, said squeeze member movably connected to said pair of guide rods, said squeeze arrangement designed to cause said squeeze member to only move downwardly when said actuating lever is pivoted relative to said second compartment.

10. The dispenser as defined in claim 8, wherein said second compartment includes a spring biased latch member, said latch member includes a catch element that is designed to be releaseably securable to said first compartment, said latch member moveable between a locked and unlocked position, said latch member spring biased in said locked position.

11. The dispenser as defined in claim 9, wherein said second compartment includes a spring biased latch member, said latch member includes a catch element that is designed to be releaseably securable to said first compartment, said latch member moveable between a locked and unlocked position, said latch member spring biased in said locked position.

12. The dispenser as defined in claim 8, wherein said second compartment includes an opening to enable a user to visually see at least a portion of said squeeze arrangement as said squeeze member moves past the vertical location of said opening on said second compartment.

13. The dispenser as defined in claim 11, wherein said second compartment includes an opening to enable a user to visually see at least a portion of said squeeze arrangement as said squeeze member moves past the vertical location of said opening on said second compartment.

14. The dispenser as defined in claim 8, wherein said squeeze member is a cylindrical roller.

15. The dispenser as defined in claim 13, wherein said squeeze member is a cylindrical roller.

16. The dispenser as defined in claim 1, wherein said second compartment includes an opening to enable a user to visually access an amount of product remaining in the product bag when the second compartment is in the closed position.

\* \* \* \* \*